United States Patent

Schoenwald

[15] 3,654,427
[45] Apr. 4, 1972

[54] ELECTRIC HEATED SOLDERING TOOL

[72] Inventor: Alexander Schoenwald, 142 Harvard St. Rear, Grove City, Pa. 16127

[22] Filed: Sept. 28, 1970

[21] Appl. No.: 75,879

Related U.S. Application Data

[63] Continuation-in-part of Ser. No. 672,847, Oct. 4, 1967, abandoned.

[52] U.S. Cl..............................219/241, 73/359, 136/228, 136/235, 219/239, 219/514, 228/54, 317/133.5
[51] Int. Cl. ................H05b 3/02, B23k 1/02, H01h 47/26
[58] Field of Search..........................................73/359-361; 219/221, 227–242, 494, 514, 519, 241; 136/228, 229, 230, 233, 242, 235; 317/133.5; 228/51–55

[56] References Cited

UNITED STATES PATENTS

| | | | |
|---|---|---|---|
| 2,735,923 | 2/1956 | Juvinall et al. | 219/241 X |
| 2,314,753 | 3/1943 | Asimow | 219/241 UX |
| 2,438,575 | 3/1948 | Ray | 136/228 |
| 2,395,849 | 3/1946 | Collom et al. | 219/241 UX |
| 2,582,481 | 1/1952 | Dvorak et al. | 219/241 |
| 2,717,952 | 9/1955 | Dvorak | 219/241 X |
| 2,747,074 | 5/1956 | Finch | 219/241 X |
| 2,159,869 | 5/1939 | Thomas et al. | 219/241 |
| 1,229,770 | 6/1917 | Marsh | 136/228 X |
| 1,584,882 | 5/1926 | Marsh et al. | 136/228 |
| 1,651,750 | 12/1927 | Brophy | 136/228 |

FOREIGN PATENTS OR APPLICATIONS

| | | | |
|---|---|---|---|
| 588,216 | 5/1947 | Great Britain | 219/241 |
| 930,351 | 8/1947 | France | 219/241 |

*Primary Examiner*—A. Bartis
*Attorney*—Meyer, Tilberry and Body

[57] ABSTRACT

An electrically heated soldering iron includes an electrical heating coil surrounding a heating element core. A metal soldering iron tip has screw threads formed on its rear end portion for releasably attaching the tip to the heating element core in heat transfer relationship. An elongated metal rod of a different metal than the tip has an end portion thereof received in a bore formed in the rear end portion of the tip. An electrical conductor is secured to the tip in spaced relationship to the rod. Both the rod and conductor extend axially rearward from the tip and make electrical contact with electrical connections within a hollow handle attached to the heating element core. The tip defines the only connection between the rod and the electrical conductor so that the tip itself forms a part of a thermocouple with the rod and electrical conductor.

2 Claims, 7 Drawing Figures

INVENTOR
ALEXANDER SCHOENWALD
BY Murray & Linkham
ATTORNEYS

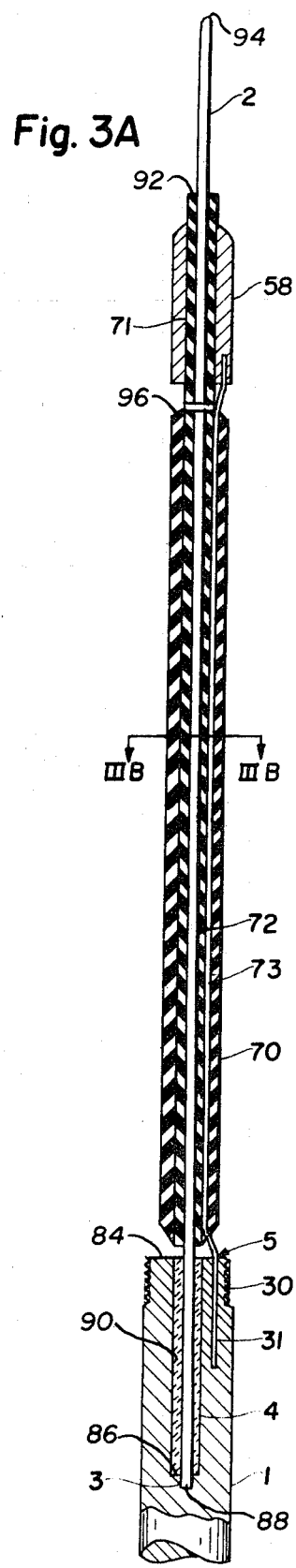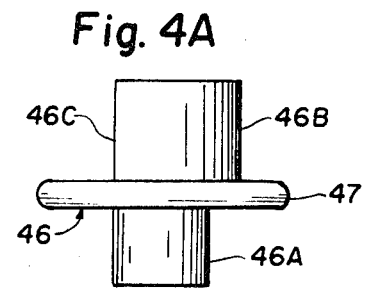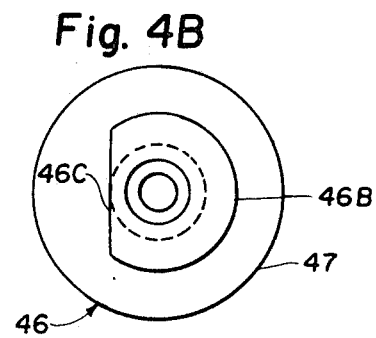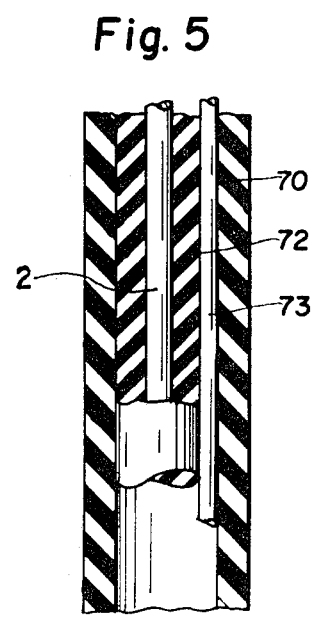

ELECTRIC HEATED SOLDERING TOOL

BACKGROUND OF THE INVENTION

This application is a continuation-in-part of U.S. application Ser. No. 672,847, filed Oct. 4, 1967, and now abandoned.

In the past soldering irons have been provided wherein the heat supplied to the tip of the iron is controlled by a thermocouple. When the temperature of the tip of a soldering iron is allowed to rise above a critical value, the tip itself is adversely affected. That is, excessive heat usually causes a rapid deterioration of the tinning on the tip so that it is essential to control the upper level of temperature as well as the lower level in order to obtain long life for the soldering iron and for the effective and efficient use thereof.

In most prior art soldering irons and similar heating tools employing thermocouples, the thermocouple was located at a point remote from the tip whose temperature was to be controlled with the result that the thermocouple could not respond to the varying temperature of the tip of the soldering iron with sufficient accuracy to function satisfactorily and maintain a substantially uniform temperature at the tip. In order to overcome this deficiency, attempts have been made to place the thermocouple in the soldering iron tip itself; however this presents considerable difficulty since the thermocouple must be relatively small; and two insulated electrical leads must be connected to the thermocouple in some manner within the tip.

SUMMARY OF THE INVENTION

As an overall object, the present invention provides a temperature-controlled heating device employing a thermocouple which overcomes the disadvantages of prior art devices of the type described above.

More specifically, an object of the invention is to provide a temperature controlled soldering iron employing a thermocouple in the tip of the soldering iron and wherein the tip comprises part of the thermocouple itself. As will be seen, this greatly simplifies the construction of the device and eliminates the need for two insulated conductors extending into the tip.

Still another object of the invention is to provide a soldering iron of the type described in which the tip and thermocouple assembly can be removed from the iron as a separate unit independently of the heating coil and power circuitry.

In accordance with the invention, the soldering iron tip or other heating element is provided with a central bore into which is inserted a rod of a different metal than the tip itself. The rod of different metal is insulated from the tip except at its lower end which is in contact with the metal of the tip such that the lower end of the rod represents the first pole of the thermocouple while the tip itself constitutes the second pole. Alternatively, a third metal may be brazed on a suited end of the tip to to constitute, with the lower end of the aforesaid metal rod, the first and second poles of the thermocouple which are separated by the metal of the tip. As will be seen, this combination makes it possible to select metal pairs such that the invention is applicable to temperature over 1,000° F. without diminishing the heat flow sensitivity of the device.

In one illustrative embodiment of the invention, the aforesaid thermocouple electrodes are connected to a deflection pyrometer provided with a photocell relay which is actuated when the desired deflection (i.e., temperature) of the pyrometer is reached. The photocell relay, in turn, controls a main line relay which, when its contacts are closed, applies power to the heating coil of the soldering iron through a step-down transformer.

When it is desired to heat up the soldering iron tip, a main switch is closed, and the photocell relay of the deflection pyrometer energizes the main line relay to close its contacts and supply power to the heating coil for the soldering iron through the aforesaid step-down transformer. As the heating coil starts to heat the tip, the tip temperature, the potential of the thermoelectric current, and the deflection of the pyrometer will rise until the deflection reaches the scale of the adjusted temperature. At this point, the photocell relay deenergizes the main line relay which interrupts the power circuit until the temperature diminishes. As a result, the deflection indicated by the pyrometer will also decrease; the main line relay will again be energized; and the power current will be switched on again.

Additionally, an idle switch is provided in the circuit which controls the power to the heating coil such that when the tool is in use, the idle switch is closed; but when the tool is idle, the idle switch is open. While the idle switch is open, a fraction of the heating power will heat the tool through a resistor in shunt with the idle switch, the power supplied to the coil during this condition being enough to hold the tool at such a minimum temperature that the abuse of the tip is at a minimum. At the same time, the idle temperature is still high enough to adjust the working temperature in the shortest possible time when the idle switch is closed and the tool is again in use. The aforesaid step-down transformer insulates the line voltage from the heating current and its voltage is low enough that it is within the limit of the safety regulation against electric shocks and personal injuries.

As will be seen, independent relation of the working temperature adjustment compared to the constant magnitude of the heating power is a very important additional innovation in economy and efficiency of the invention. The heating power is not restricted to the equilibrium of the cooling of the surface of the tool to its environment. Consequently, the design of the soldering tool can be minimized to the most suited weight, size and shape. The heat flow can be raised to such a maximum in the shortest time in reaching the required working temperature that the recovery time of the tool is practically eliminated.

The above and other objects and features of the invention will become apparent from the following detailed description taken in connection with the accompanying drawings which form a part of this specification, and in which:

FIG. 3A is a cross-sectional view of the independent mechanical assembly of the tip and its thermocouple electrodes and terminals shown in FIG. 2;

FIG. 3B is a cross-sectional view taken along line IIIB—IIIB of FIG. 3A;

FIGS. 4A and 4B are side and top views, respectively, of the handle-head segment of the embodiment shown in FIG. 2; and FIG. 5 is an enlarged cross-sectional view of the assembly of FIG. 3A.

Figure 1:
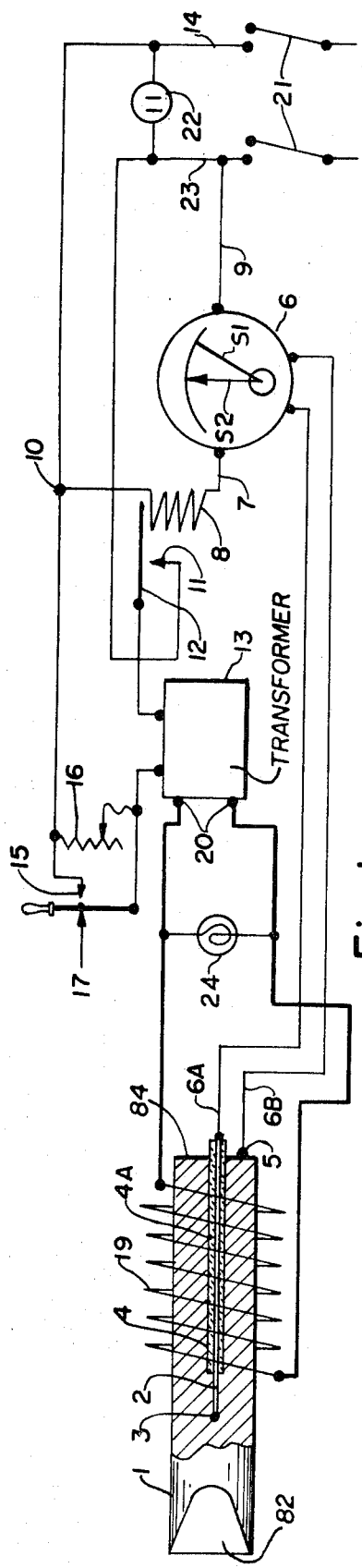
FIG. 1 is a schematic circuit diagram of the heating tool of the invention.

With reference now to the drawings, and particularly to FIG. 1, the soldering iron tip itself is designated by the reference numeral 1 and may be formed, for example, from a metal such as copper. The tip 1 is provided with a bore 4 into which is inserted a metal rod 2 brazed to the bottom of the bore 4 as at 3. The upper extent of the bore 4 is of larger diameter than its lower end and is filled around rod 2 with refractory insulation 4A.

With this arrangement, the rod 2 comprises one pole of the thermocouple while the tip 1, which is a different metal than the rod 2, may comprise the other pole. Alternatively, the second electrode may comprise a metal bead 5 brazed to the upper end of the tip 1 and formed from a metal which must be different than the metal of the first pole formed by the rod 2.

Both electrodes are connected through leads 6A and 6B to a deflection pyrometer, generally designated by the reference numeral 6. The deflection pyrometer 6 may, for example, be of the Type 195 manufactured by the General Electric Company, Schenectady, New York. It includes a set pointer S1, which may be adjusted manually to the desired temperature, and a second pointer S2 which indicates actual temperature as determined by the voltage produced across leads 6A and 6B by the thermocouple. When the pointer S2 reaches the position of the set pointer S1, the circuit between leads 7 and 9 is broken by means of a photocell relay within the deflection pyrometer 6 itself.

It will be noted that the lead 9 is connected to input power lead 23; while lead 7 is connected through the energizing coil of a relay 8 to the other power lead 14 as at 10. As long as the pointer S2 does not intersect the position of pointer S1, relay 8 will be energized to close its two contacts 11 and 12; however when the pointer S2 reaches the position of pointer S1, the relay 8 is deenergized and contacts 11 and 12 open. 60-cycle, 110-volt power is supplied to leads 23 and 14 through a main line switch 21; while a parallel-connected neon signal light 22 is provided between leads 23 and 14 as shown.

The lead 14 is connected through contacts 15 of an idle switch 17 to one side of the primary winding of a transformer 13. In shunt with the idle switch 17 is a potentiometer 16, the arrangement being such that when the tool is in use, the switch 17 is closed; whereas when the switch 17 is open, the potentiometer 16 regulates the power supplied to the transformer 13 to a sufficiently low value such that the power supplied to the heating coil for the soldering iron is maintained at a value which will not cause abuse to the tip but which will nevertheless minimize the required heat-up time once the idle switch 17 is again closed. The lead 23 is connected through contacts 11 and 12 of relay 8 to the other terminal of the primary winding for transformer 13. The secondary winding of transformer 13 is connected through leads 20 to the heating coil 19 for the soldering iron. Connected in parallel with the secondary winding of transformer 13 is a low voltage signal light 24.

With the arrangement shown, and assuming that the soldering iron tip 1 is cool, the photocell relay of the pyrometer 6 will interconnect leads 7 and 9 whereby relay 8 is energized and contacts 11 and 12 are closed. If it is desired to use the iron, idle switch 17 is closed whereby the full-line power is supplied to the primary winding of transformer 13. The voltage appearing across the secondary winding of transformer 13 energizes the heating coil 19, thereby raising the temperature of the tip 1. As the temperature of the tip 1 rises, the thermocouple comprising the rod 2 and the tip 1 or metallic brazing 5 will cause the pointer S2 to move in a clockwise direction as viewed in FIG. 1. This action will continue until the tip reaches the desired temperature indicated by the setting of set pointer S1, whereupon relay 8 will be deenergized; power to the heating coil will be cut off; and the tip will cool until the relay 8 is again energized. It can be seen that since the thermocouple measures the temperature of the tip itself rather than the surrounding elements, extremely accurate control of temperature can be obtained.

Figure 2:
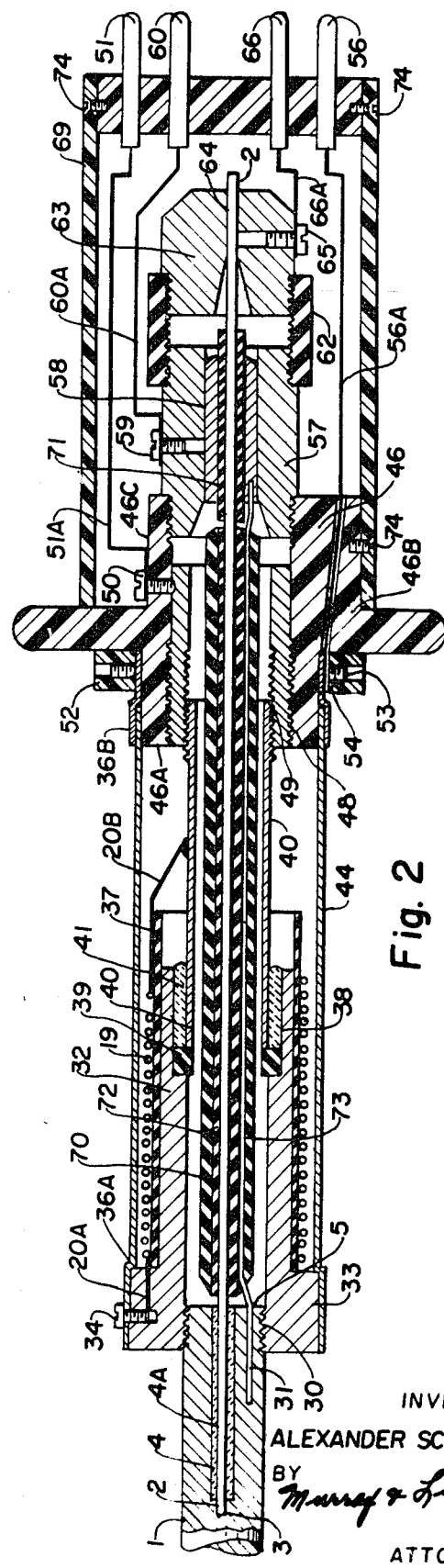
FIG. 2 is a cross-sectional view of a preferred embodiment of the invention.

With reference now to FIG. 2, the metal rod 2 is inserted into the tip 1 as mentioned above and comprises the first pole of a thermocouple. It is made from a metal different than the tip and brazed to the bottom of the bore at 3. The space between the rod 2 and the bore 4 into which it is inserted is filled with a refractory insulator 4A. Also provided in the tip is a second bore 31 approximately half as deep as the bore 4. The bore 31 receives the second pole electrode 5 which is fully brazed to the tip to secure positive safety of the connection. This second electrode 5 can be made of the same metal as the tip or of another different metal, but must be different than the first pole metal to achieve a thermoelectric voltaic effect, as will be understood. At temperatures below about 600° F., the tip 1, usually copper or possibly silver, forms an active part of the thermocouple. That is, it forms one pole of the thermocouple with the rod 2 which may, for example, be formed from constantan. At temperatures above about 600° F., copper is unsatisfactory for accurate temperature measurements. Accordingly, above 600° F. the tip may be formed from a metal such as iron, or it may still be formed from copper, in which case the bead 5, forming the other pole, may be formed from iron or some other suitable metal other than constantan.

The tip 1 is threaded as at 30 into a cylindrical heating element core 32 having a collar or flange 33 at its forward end. Surrounding the major portion of the cylindrical core 32 is a mica insulator 37; and around the insulator 37 is the main heating coil 19. The forward end of the heating coil 19 is connected through lead 20A to a screw 34 threaded into the flange 33; while the other end of the coil 19 is connected to a lead 20B. The screw 34 also serves to secure a stainless steel barrel or tube 44 to the flange 33. The barrel 44 is ferruled as at 36A to provide a telescoping fit of its forward end over the flange 33.

The inner periphery of the core 32 is enlarged as at 38 in an amount approximately one-fifth the full length of the core. At the bottom of the enlarged diameter portion 38 is a mica washer 39. Seated on the mica washer 39, in turn, is a stainless steel tube 40; and between the tube 40 and the enlarged diameter portion or bore 38 is a refractory cement 41. The lead 20B is brazed to the stainless steel tube 40 and, hence, the tube 40 comprises one electrode of the heating coil 19 while the outer tube 44 comprises the other electrode.

The tubes 40 and 44 are secured to a handle head 46, perhaps best shown in FIGS. 4A and 4B. It is formed from plastic or some other suitable material and is provided with a flanged portion 47. On one side of the flanged portion 47 is a first cylindrical section 46A, and on the other side is a more or less semicylindrical portion 46B provided with a flattened surface 46C. As shown in FIG. 2, the interior of the handle head 46 is hollow; and its lower end is threaded as at 48 to receive a metallic smaller core 49. The core 49, in turn, is threaded onto the stainless steel tube 40 connected to the rear end of the heating coil 19. Projecting through the flattened portion 46C of the handle head 46 is a screw 50 which engages the metallic core 49. The screw also serves to secure the forward end of a power lead 51A having its other end connected to a rear power plug 51.

Fitted over the periphery of the portion 46B of handle head 46 is a ferruled tube 36B which slips over the end of the outer stainless steel tube 44. Surrounding the ferruled tube 36B is a ferrule ring 52 provided with three screws 53 which fix the ferrule ring to the ferrule itself and thus hold the assembled parts in fixed relationship. One of the screws 53 is provided with a groove 54 on the inside of the ferrule ring which serves as a connector for the other power lead 56A which is connected to a front power plug 56. Thus, when a source of power is applied across plugs 51 and 56, a circuit will be completed to the heating coil 19 from plug 51 through lead 51A, screw 50, core 49, tube 40, lead 20B, the coil 19, lead 20A, screw 34, tube 44, ferruled member 36B and lead 56A back to the power plug 56.

Threaded into the upper end of the handle head 46 is a metalic core 57 having connected thereto a lead 60A by means of screw 59. The lead 60A, in turn, is connected to a first pole power plug 60. Threadedly received on the upper end of the metallic core 57 is a cylindrical plastic insulator 62 which, in turn, receives a metallic member 63 into which the rod 2 fits. The member 63 is provided with a screw 65 which connects one end of lead 66A to the member 63. The other end of lead 66A is connected to a second pole plug 66. All of the plugs 51, 60, 66 and 56 are carried within an insulating block 68; and a tubular member 69 of insulating material extends between the handle head 46 and insulating block 68 and is secured thereto by means of screws 74 to provide a handle.

In accordance with the present invention, the thermocouple element itself is received within the soldering iron as an independent unit. This independent unit is shown in detail in FIGS. 3A, 3B and 5 and includes an insulating sleeve 72 which surrounds the rod 2 from the tip 1 throughout most of its length. Lead 73, connected to the second pole electrode 5, is disposed outside the insulating sleeve 72 and, in turn, is covered with an insulating sleeve 70. The lead 73, at its upper end, is connected to a plug 58 carried on a sleeve-type insulator 71 surrounding the rod 2. The plug 58, in turn, fits into the metallic core 57 as shown in FIG. 2 and, hence, is connected to the first pole plug 60. The upper end of the rod 2, of course, fits into an opening 64 in metallic member 63 and, hence, is connected to a second pole plug 66. The plugs 60 and 66 are thus connected to the thermocouple circuit; whereas the plugs 51 and 56 are connected to the power circuit for the soldering iron. The unit shown in FIG. 3A may thus be removed from the soldering iron shown in FIG. 1 by simply rotating the tip 1 to disengage it from the rest of the iron via threads 30.

It will be recognized that the combined soldering iron tip and thermocouple assembly of the present invention provides a very economical replacement item for use with soldering irons. Tip 1 has a working end portion 82 and a rear end portion 84. Screw threads 30 on rear end portion 84 define an attachment means for releasably attaching tip 1 to a soldering iron. Bore 4 is centrally located axially of tip 1 and has a bottom 86 within the body of tip 1. That is, bottom 86 of bore 4 is spaced rearward from working end portion 82 and front end portion 88 of rod 2 is brazed to the bottom of bore 4. Bore 4 has a larger diameter than rod 2 to provide space for insulating material 90 which surrounds rod 2 within bore 4. Insulating material 72 which surrounds rod 2 may e a braided glass insulator. Such braided glass insulator may be coated or impregnated with elastomeric material, or insulation 72 may simply be elastomeric insulating material such as natural or synthetic rubber, polyvinylchloride or polyethylene. Insulating material 70 may be formed in the same manner. Insulating material 72 extends from rear end portion 84 of tip 1 to a terminal position 92 spaced forward from rear end portion 94 of rod 2. This leaves a rear end portion of rod 2 uncovered with insulating material so that it can make releasable electrical contact with an electrical connector. Insulating material 70 surrounds wire 73 and extends from rear end portion 84 of tip 1 to a terminal position 96 spaced forward from terminal position 92 of rod insulating material 72. This spacing of terminal positions 92 and 96 of insulating material 72 and 70 provides a location for electrical connector 58 with which wire 73 is electrically connected. It will be recognized that it is possible to have insulating material 70 and 72 in contact with rear end portion 84 of tip 1. In addition, it is possible to have electrical connector 58 surrounding insulating material 70. In another arrangement, wire 73 may be a metallic sleeve which either completely or partially surrounds insulating material 72 and has a portion exposed beyond terminal position 96 of insulating material 70 to form an electrical connector itself in the absence of connector 58. It will be recognized that a most important feature of the present invention is the arrangement in which tip 1 itself forms a part of the hot junction of a thermocouple with rod 2 and wire 73. Wire 73 is secured to tip 1 in a location spaced from rod 2 so that the only connection between rod 2 and wire 73 is defined by the metal of tip 1 itself. This arrangement provides a much more accurate determination of the temperature of tip 1 because the thermocouple is directly responsive to the temperature of tip 1.

Although the invention has been shown in connection with a certain specific embodiment, it will be readily apparent to those skilled in the art that various changes in form and arrangement of parts may be made to suit requirements without departing from the spirit and scope of the invention.

Having thus described my invention, I claim:

1. An electrically heated soldering iron comprising; a generally cylindrical hollow heating element core, an electrical heating coil surrounding said core, an electrically conductive metal soldering iron tip having a working end portion and a rear end portion, attachment means on said tip for releasably attaching said tip to said core in heat-transfer relationship so that said tip is heated by conduction of heat from said core to said tip when said coil is energized, said attachment means comprising screw threads on said rear end portion of said tip, said rear end portion of said tip having a centrally located bore therein, said bore having a bottom within the body of said tip and spaced rearward from said working end portion, an elongated electrically conductive metal rod having a diameter smaller than said bore, said rod having a front end portion received in said bore in centrally located position, said rod having a front end brazed to said bottom of said bore, insulating material in said bore surrounding said rod, said rod being of a different metal than said tip and extending axially rearward therefrom, a metal electrical conductor secured to said tip in spaced relationship to said rod and extending axially rearward therefrom, said electrical conductor being formed of a metal different than said rod, said tip itself forming part of the hot junction of a thermocouple and defining the sole connection between said rod and said electrical conductor, said rod and said electrical conductor having rear end portions axially spaced from said tip, electrical insulating material insulating said rod and said electrical conductor from one another and covering said rod and said electrical conductor from said rear end portion of said tip to points spaced from said rear end portions of said rod and electrical conductor, said rod and said electrical conductor having their rear end portions exposed and free of covering insulating material in axially spaced electrically insulated relationship to one another, said soldering iron including hollow handle means attached to said core opposite said tip, said handle means having a pair of first and second electrical connections therein, said rod and said electrical conductor extending through said core and into said handle means and having said rear end portions thereof in quick-releasable sliding frictional engagement with said electrical connections, a pair of third and fourth electrical connections in said handle means separate from said first and second connections for connecting said heating coil to a voltage source, and means on said handle for connecting said first, second, third and fourth electrical connections with control means for interrupting flow of current to said coil when the temperature sensed by the thermocouple defined by said rod, tip and electrical conductor reaches a predetermined value.

2. A combination thermocouple assembly and soldering iron tip comprising; a solid one-piece electrically conductive metal body member defining a soldering iron tool tip having a working end portion and a rear end portion, attachment means on said rear end portion of said tip for releasably attaching said tip to a soldering iron, a centrally located bore formed axially of said tip and extending from said rear end portion toward said working end portion, said bore having a bottom within said tip and being spaced rearward from said working end portion, an elongated electrically conductive metal rod having a front end portion, said rod being formed of a metal different from said tip, said rod having a smaller diameter than said bore, said front end portion of said rod being received in said bore and attached directly only to said bottom of said bore in electrical and thermal transfer relationship with said tip, electrical and thermal insulating material positioned in said bore and surrounding said rod in said bore, said rod and said insulating material defining the only elements within said bore, a metal electrical conductor attached directly to said rear end portion of said tip in radially spaced relationship to said bore and said rod, said electrical conductor being of a metal different from said rod and extending rearward from said tip in spaced relationship to said rod, said rod and said electrical conductor having rear end portions spaced axially from said tip, electrical insulating material insulating said rod and said electrical conductor from one another and covering said rod and said electrical conductor from said rear end portion of said tip to points spaced from said rear end portions of said rod and said electrical conductor, said rod and said electrical conductor having their rear end portions exposed and free of covering insulating material in axially spaced electrically insulated relationship to one another, said rod said insulating material and said electrical conductor defining the only elements connected with said tip, said tip forming the only connection between said rod and said electrical conductor and defining a part of the hot junction tip of a thermocouple with said rod and said electrical conductor, said rod and said electrical conductor being of different metals which produce a thermoelectric voltaic effect when said tip is heated.

* * * * *